United States Patent [19]

Browning

[11] 4,401,445
[45] Aug. 30, 1983

[54] METHOD FOR CONVERTING A LIQUID PAINT SPRAY BOOTH TO A POWDER PAINT SPRAY BOOTH

[76] Inventor: Jesse Browning, 5615 Leeds St., Southgate, Calif. 90280

[21] Appl. No.: 244,718

[22] Filed: Mar. 17, 1981

[51] Int. Cl.³ ............................................. B01D 46/48
[52] U.S. Cl. ......................................... 55/96; 55/97;
   55/302; 55/356; 55/422; 55/430; 55/472;
   55/481; 55/504; 55/DIG. 46; 98/115 SB;
   118/326
[58] Field of Search ...................... 55/96–97,
   55/DIG. 46, 356, 422, 481, 493, 504, 302, 430,
   472; 98/115 SB; 118/326, DIG. 7

[56] References Cited

U.S. PATENT DOCUMENTS

| | | | |
|---|---|---|---|
| 3,520,066 | 7/1970 | Meade | 55/430 X |
| 3,719,030 | 3/1973 | Blankemeyer et al. | 55/97 |
| 3,724,416 | 4/1973 | Diamond et al. | 55/302 X |
| 3,877,899 | 4/1975 | Bundy et al. | 55/430 X |
| 4,223,599 | 9/1980 | Napadow | 98/115 SB |
| 4,245,551 | 1/1981 | Berkmann | 55/356 X |
| 4,260,400 | 4/1981 | Scalet | 98/115 SB X |
| 4,277,260 | 7/1981 | Browning | 55/356 X |
| 4,303,417 | 12/1981 | Koch | 55/96 |

Primary Examiner—Kathleen J. Prunner
Attorney, Agent, or Firm—Blakely, Sokoloff, Taylor & Zafman

[57] ABSTRACT

A method for converting conventional paint spray booths to booths for accommodating either liquid or powder spray paints comprising removing the conventional waterfall or cloth filter back and substituting therefore an exhaust system, velocity stacks, and a roll away filter cart having replaceable and interchangeable filter elements for filtering liquid or powder paints. The rollaway filter cart may also have a vibrating sheet for directing recovered powder toward the bottom of the filter cart.

7 Claims, 7 Drawing Figures

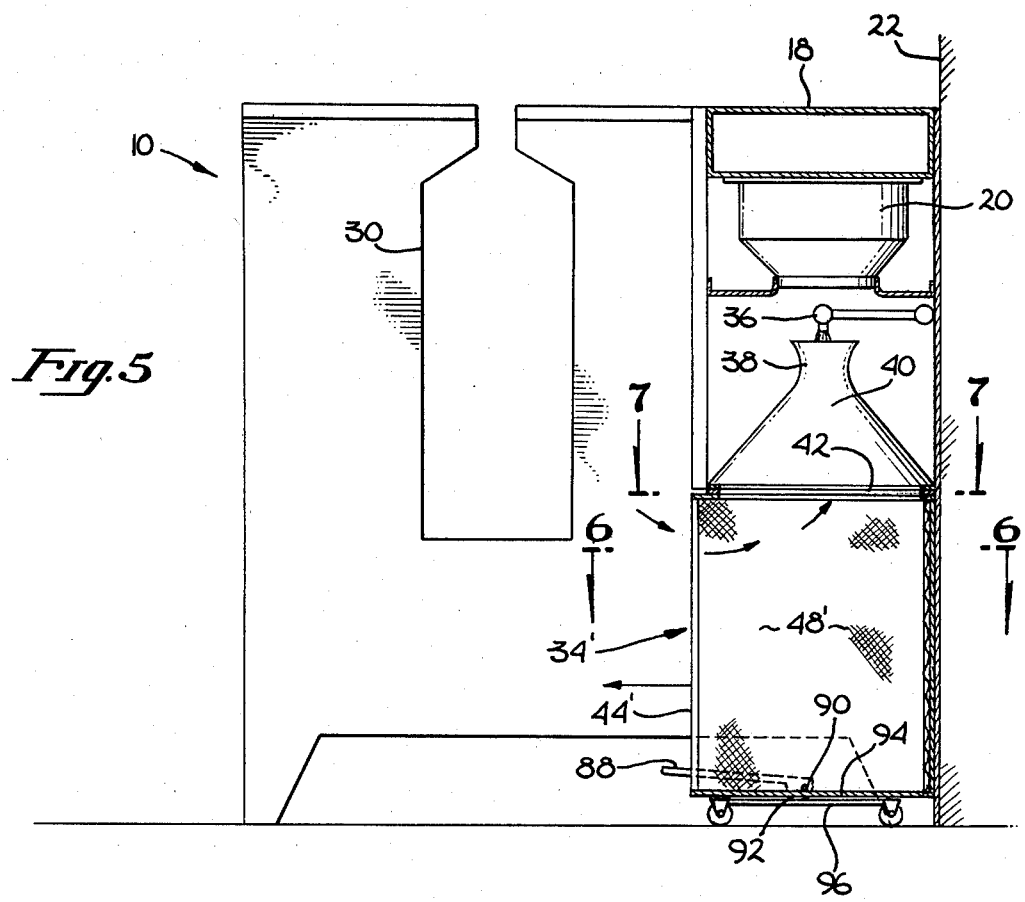
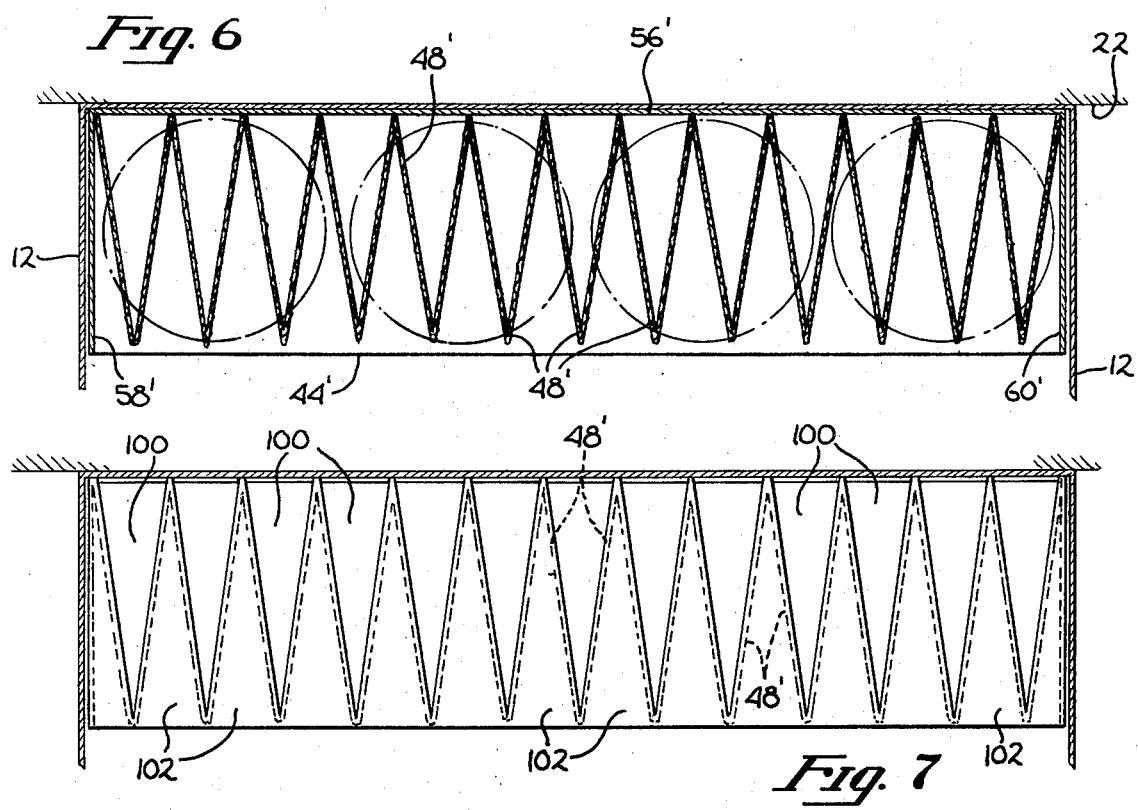

METHOD FOR CONVERTING A LIQUID PAINT SPRAY BOOTH TO A POWDER PAINT SPRAY BOOTH

SUMMARY OF THE INVENTION

There are presently existing a large number of liquid paint spray booths having either a waterfall filter back or a dry filter back. It appears that in the future, spray painting will use powdered spray paint, since liquid spray paints using organic solvents may be banned. The present invention provides a method whereby a conventional liquid paint spray booth may be converted into a spray booth suited to the use of powdered or liquid spray paint by simple exchange of a filter cart.

The conventional filter means such as the waterfall back or dry filter back is removed and in place thereof are provided an exhaust fan, a reverse flushing means for cleaning filter elements without shutting down the booth, and a roll away filter cart for holding the filters. A different filter cart configuration is used for the powdered spray paint than for the liquid spray paint. In either case the filters are mounted on a roll away cart which rolls underneath the reverse flushing means. In the preferred embodiment the roll away cart is substantially as wide as the inside width dimension of the spray booth. A lever, or other suitable means to raise the filter cart for close engagement with the reverse flushing means, is provided on the side of the cart facing the open side of the spray booth. The roll away filter cart may also be provided with a roll-up rubberized plastic sheet, adapted for disposition beneath the items to be sprayed passing through the booth, to catch powdered paint as it falls from the items and to direct the powdered paint to a collection area in the filter cart. The sheet is also substantially as wide as the spray booth and may be adapted to be vibrated to assist the powder to slide down the sheet to the filter cart.

DESCRIPTION OF THE FIGURES

FIG. 5 is similar to FIG. 2 but illustrates an embodiment of the invention suited for using liquid spray paint.

FIG. 6 is a section view taken along the line 6—6 of FIG. 5.

FIG. 7 is a section view taken along the line 7—7 of FIG. 5, showing the top of the filter cart.

DETAILED DESCRIPTION OF THE PREFERRED EMBODIMENT

A typical liquid paint spray booth has two vertical side walls, a back wall and an open front. The top of the booth is open so that items to be sprayed may be conveyed into the booth, through openings provided in the two sidewalls, such as by an overhead conveyor. Other methods of conveying items into the booth, such as conveyor belts for batch processing, can also be used, or the items to be sprayed may be manually placed into the booth. In the spray booth, a portion of the back wall comprises an opening fitted with either a dry filter means or, in some instances, an opening communicating with a waterfall filter. In the typical installation, the back wall of the spray booth is placed in close spaced relation to an interior wall of the building in which the booths are located. The space between the back wall of the booth and the wall of the building is sufficient to accommodate the dry filter assembly or the waterfall filter back as the case may be. Such spray booths, because of the close proximity of the rear wall of the booth to the wall of the structure are unsuited to be able to gain access to the filter assembly from the rear of the booth.

For various reasons, the use of powder spray paints is increasing. It is therefore desirable that presently existing liquid paint spray booths be converted at minimum expense to accommodate powder spray paints without loosing the ability to accommodate liquid spray paints.

A basic distinction in operating a liquid paint spray booth versus a powder spray paint booth is that liquid paint overspray is not collected for reuse, but is rather merely filtered out of the air in which it is entrained. Powder paint overspray, for increased efficiency, may be filtered from the air, collected and reused. When a spray booth is converted, as taught herein, the booth may be used for liquid spray paint or for powder spray paint, the changeover from one to the other being effected by the simple exchange of filter carts. One filter cart is designed for liquid spray paint, another for powder spray paint.

Figure 1:
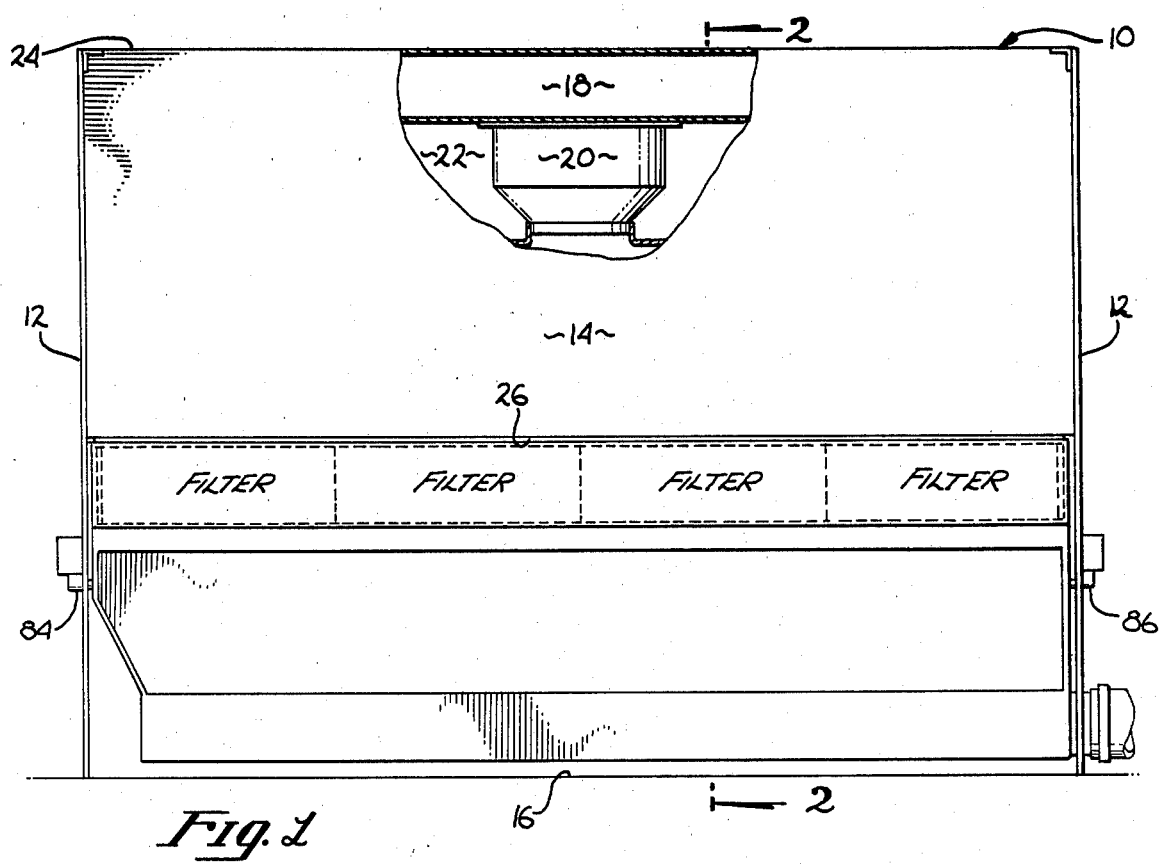
FIG. 1 is a front plan view of a paint spray booth modified according to the invention to use powdered spray paint.
Figure 2:
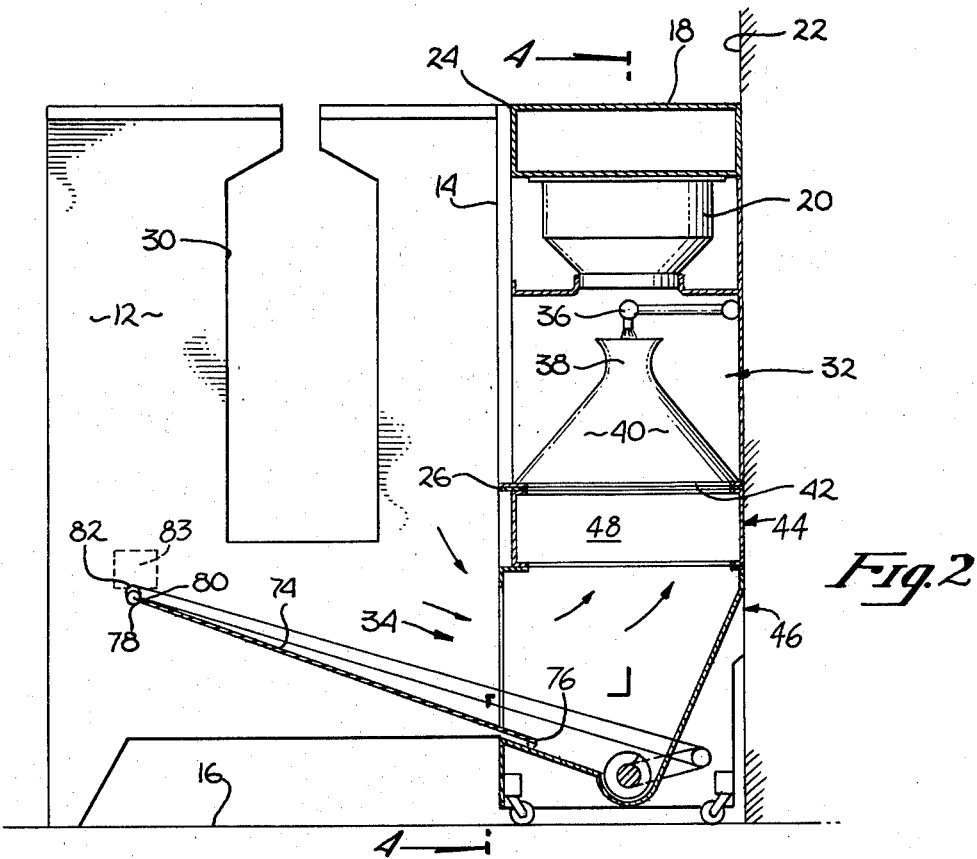
FIG. 2 is a section view taken along the line 2—2 of FIG. 1.

A liquid paint spray booth modified according to the invention and showing the filter cart used for powdered paint is shown in FIG. 1.

The booth 10 has a pair of vertical side walls 12, a back and a floor 16. Part of the back wall 14 is cut away to show the exhaust outlet 18 and exhaust fan housing 20 located behind the back wall 14, between it and the structural wall 22. The back wall 14 has a top edge 24 and a bottom edge 26. The aperture 28 defined by the space between the bottom edge 26 and the floor 16 is normally filled by a dry filter means or communicates with a waterfall back located between back wall 14 and structural wall 22. Each side wall 12 is provided with an opening 30 to permit items-to-be-sprayed to pass through booth 10 such as on an overhead conveyor (not shown).

Figure 3:
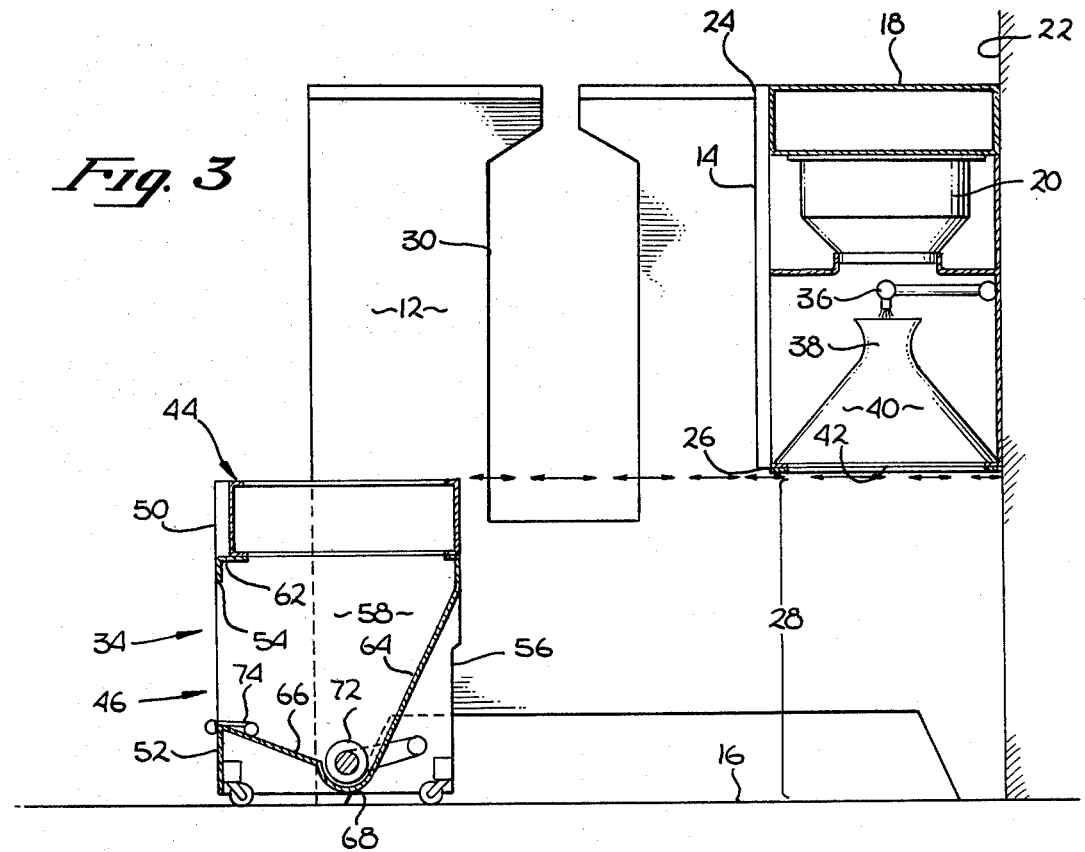
FIG. 3 illustrates the mobile nature of the filter cart.
Figure 4:
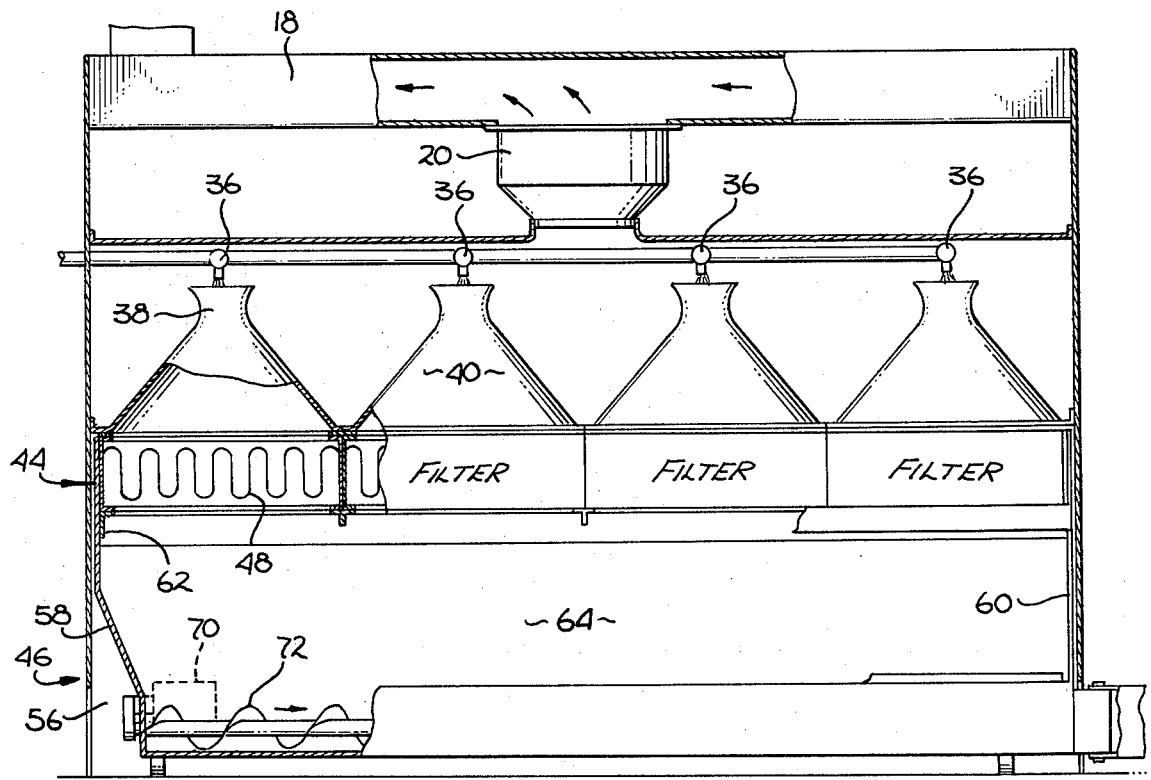
FIG. 4 is a section view taken along the line 4—4 of FIG. 2.

To convert presently existing liquid paint spray booths to accommodate liquid or powder spray paints, the filter means (whether a dry filter or waterfall filter) is removed from between back wall 14 and structural wall 22. In the vacated space are then mounted an exhaust outlet 18, an exhaust fan and housing 20, a reverse flushing means 32, and a roll-away filter means 34. If the pre-existing spray booth already used an exhaust fan and exhaust outlet within the space between walls 14 and 22, they may be retained and used in the converted booth. While the exhaust fan and housing 20 are shown as being axially exhausted into outlet 18, it is obvious that a squirrel cage radially exhausting fan could be used provided the lower wall of outlet 18 (as best shown in FIGS. 3 and 4) was perforated to allow the radially exhausted air to enter the exhaust outlet 18. Other equivalent configurations may be readily devised.

The reverse flushing means 32 may comprise air nozzles 36 for directing a blast of high pressure air into the top end 38 of velocity stacks 40 which at their bottom ends 42 are in close proximity to filter elements 48 mounted on the filter means 34. The filter means 34 illustrated in FIGS. 1-4 is particularly suited to filtering powder spray paint and comprises a wheeled cart having a filter chamber 44 and a collection chamber 46. A plurality of filter elements 48 may be placed within the filter chamber 44 to filter powder laden air from the collection chamber 46. The filter means 34 has a top 5 front wall 50 and a bottom front wall 52 bounding an aperture 54 through which the powder laden air enters the collection chamber 46. The remainder of the filter means 34 is defined by a back wall 56 an two end walls 58 and 60. The filter chamber 44 is located at the uppermost portion of the filter means 34 and has an open top. This permits the filter elements 48 to be easily and conveniently dropped vertically into the filter chamber 44 where they rest on brackets 62. The interior of the collection chamber 46 comprises a sloping rear surface 64 and a sloping forward surface 66 which direct collected powder toward a trough 68 formed at their intersection. A means for moving collected powder from one end of the trough 68 to the other may comprise a motor 70 driving a screw blade 72, the screw blade 20 being mounted in a close fitting relationship to the walls of the trough 68. A means may also be provided to draw powder out of the trough 68 and direct it to a central collecting location. Such means may include a collecting tube coupled to the end of trough 68.

In addition, the filter means 34 may be provided with a collapsible sheet 74, one edge 76 of which, is secured immediately above the forward edge of sloping forward surface 66, the other edge 78 of which is held rigid as by a rod 80 inserted through a sleeve 82, with the ends of rod 80 being mounted in brackets 84 and 86 located on the sidewalls of the booth 10. The sheet 74 is drawn nearly taut, with the rod 80 elevated above the forward edge of sloping surface 66. The sheet extends beneath the path of travel of objects passing through the booth 35 10. Thus, as the objects are sprayed with powder, any overspray powder will fall into sheet 74 beneath the object, and be directed by the slope of sheet 74, toward trough 68. To increase the tendency of powder to slide down sheet 74, the entire sheet may be vibrated. This 40 may be accomplished by an appropriate motorized mechanism 83 coupled to rod 80 on the sidewall of the booth 10. The mechanism may be driven by the same motor that powers screw blade 72.

To change the paint color, or change the filter elements 48, the sheet 74 is rolled up onto rod 80 which is appropriately temporarily secured to bottom front wall 52 of the filter means 34. The filter means 34 may then be conveniently rolled out through the open front side of the spray booth 10 as shown in FIG. 3. The reverse flushing means 32 and the exhaust fan in housing 20 and exhaust outlet 18 remain in place. New filter elements 48 may be installed in filter chamber 44 or a completely new filter means 34 may be rolled back under the reverse flushing means 32.

The filter means 34' illustrated in FIGS. 5 and 6 enable the converted spray booth 10 to accommodate liquid spray paints. Filter means 34' has a fully open front side to permit sliding insertion of filter elements 48' into the filter chamber 44'. The filter means 34' does not have sloping interior surfaces intersecting to form a trough nor any means such as screw blade 72 for conveying filtered particles. Instead, the liquid paint particles entrained in the air entering the filter chamber 44' are directly filtered out of the air onto the filter elements 48'. They are not collected for reuse. The filter means 34' thus does not have a collection chamber per se, the entire interior of the filter means 34' constituting the filter chamber 44'. Unlike filter means 34 which has a fully open top, the top of filter means 34' is only partly open. As shown in FIG. 7, the top of filter means 34' is comprised of alternating triangular areas 100 and 102. The areas 100 are open and areas 102 are solid, i.e., closed. This insures that all air entering filter chamber 44' must pass through a filter element 48' before it can be drawn upward by the exhaust system.

Like filter means 34, filter means 34' is mounted on wheels for easy changing of the filter elements 48'. Merely by rolling away one filter means 34' and rolling in another, the booth 10 can be used for painting a new color. There is no need to remove each individual filter element 48' and replace with a new one or one of another color. The roll away filter means 34' has a back wall 56' and end walls 58' and 60'. The roll away filter means 34' is sized so that it just fits into the booth 10, the distance between side walls 12 being just slightly greater than the width of the filter means from end wall 58' to 60'.

In order to insure that the top end of the filter elements 48' are in close proximity to the bottom end 42 of the velocity stacks 40, a pivoted and cammed lever arm 88 is provided. The lever arm 88 is positioned to be accessible from the front side of the filter means 34' because access to the back and ends of the filter means 34' is severely restricted because of its close fitting relationship to booth 10. Lever arm 88 pivots about pin 90 secured to the body of filter chamber 44'. The pivoting of lever arm 88 brings cammed surface 92 in play to raise the floor 94 of filter chamber 44' with respect to the wheeled platform 96 on which the filter chamber 44' is mounted. The raising of filter chamber 44' brings the top of filter elements 48' into close proximity with the open bottom end 42 of the velocity stacks 40. This same lever arm 88 mechanism can readily be employed with the filter chamber 44 described earlier with respect to the filter means 34 used for powdered paints. In either case, the lever arm 88 could be replaced by any suitable means for raising the filter chamber 44 or 44' such as hydraulic or pneumatic lifters.

There has thus been described a simple and efficient method and apparatus for converting presently existing paint spray booths to spray booths which can accommodate both powder and liquid spray paints by an easily effected change of filter elements. The filter elements are mounted on a roll-away filter cart which is readily rolled out through the open side of a paint spray booth. The filter cart used with powdered paint may be equipped with a vibrating sheet for collecting and directing overspray powder to a suitable collection means such as a trough or fluidized bed. While the description has been of the embodiments illustrated in FIGS. 1 through 7, it should be readily apparent that many changes in details of construction and material may be made by one of ordinary skill in the art without departing from the spirit and scope of the invention. Neither the Figures nor the discussion should be interpreted as limiting the scope of the invention, which is intended to be defined by the appended claims.

What is claimed is:

1. A method for converting a liquid paint spray booth to a powder paint spray booth, said liquid paint spray booth comprising an open front side, two opposing side walls having apertures therethrough for movement of items to be sprayed into said booth, and a back wall having an aperture to which a first filter means is coupled to be in communication with the interior of said booth, said method comprising the steps of:
(a) removing said first filter means from the back wall of the spray booth;
(b) replacing said first filter means with a second filter means coupled to the back wall of the spray booth, said second filter means comprising:
(i) a roll away filter cart, which rolls into place at the back of said booth, by rolling through the open front side of said booth, said cart having chamber means for collecting powder laden air from the booth through the aperture in the back wall of the booth;
(ii) filtering elements located above and in communication with said chamber means for filtering powder laden air from said chamber means;
(iii) reverse flushing means disposed above and directed toward said filtering elements for cleaning said filtering elements by directing a burst of high pressure air therethrough;
(iv) exhaust means located above the reverse flushing means for discharging cleaned air into the atmosphere; and
(v) a collapsible sheet disposed beneath said items to be sprayed, said sheet sloping downward and toward said chamber means and extending through the aperture in the back wall, whereby powder falling off said items is directed to said chamber means.

2. The method according to claim 1 wherein said sheet is connected to a vibrating means for vibrating said sheet to aid said powder to flow to said chamber means.

3. The method according to claim 2 wherein said chamber means is substantially as wide as the distance separating said opposing side walls of said booth.

4. The method of claim 1 wherein one edge of said sheet is secured to a sloping forward surface in said chamber means and an opposing edge is supported by a rigidifying means extending across the width of said booth.

5. The method according to claim 1 wherein said collapsible sheet is substantially as wide as the width of said booth.

6. A method for converting a liquid paint spray booth to a powder paint spray booth, said liquid paint spray booth comprising an open front side, two opposing side walls having apertures therethrough for movement of items to be sprayed into said booth, and a back wall having an aperture to which a first filter means is coupled to be in communication with the interior of said booth, said method comprising the steps of:
(a) removing said first filter means from the back wall of the spray booth;
(b) replacing said first filter means with a second filter means coupled to the back wall of the spray booth, said second filter means comprising:
(i) a roll away filter cart, which rolls into place at the back of said booth, by rolling through the open front side of said booth, said cart having chamber means for collecting powder laden air from the booth through the aperture in the back wall of the booth and means for conveniently raising said cart;
(ii) filtering elements located above and in communication with said chamber means for filtering powder laden air from said chamber means;
(iii) reverse flushing means disposed above and directed toward said filtering elements for cleaning said filtering elements by directing a burst of high pressure air therethrough; and
(iv) exhaust means located above the reverse flushing means for discharging cleaned air into the atmosphere.

7. The method according to claim 6 wherein said means for raising is a cammed lever located on the side of said cart facing the open side of said booth.

* * * * *